United States Patent
Sagala et al.

(10) Patent No.: US 8,564,477 B2
(45) Date of Patent: Oct. 22, 2013

(54) HIGH-FREQUENCY MODULE AND METHOD OF MANUFACTURING THE SAME, AND TRANSMITTER, RECEIVER, TRANSCEIVER, AND RADAR APPARATUS COMPRISING THE HIGH-FREQUENCY MODULE

(75) Inventors: Djuniadi Arifin Sagala, Soraku-gun (JP); Kazuki Hayata, Soraku-gun (JP); Yuji Kishida, Soraku-gun (JP)

(73) Assignee: Kyocera Corporation, Kyoto (JP)

( * ) Notice: Subject to any disclaimer, the term of this patent is extended or adjusted under 35 U.S.C. 154(b) by 337 days.

(21) Appl. No.: 12/935,889

(22) PCT Filed: Mar. 31, 2009

(86) PCT No.: PCT/JP2009/056743
§ 371 (c)(1),
(2), (4) Date: Sep. 30, 2010

(87) PCT Pub. No.: WO2009/123233
PCT Pub. Date: Oct. 8, 2009

(65) Prior Publication Data
US 2011/0025552 A1    Feb. 3, 2011

(30) Foreign Application Priority Data

Mar. 31, 2008  (JP) ................................. 2008-094349
Mar. 31, 2008  (JP) ................................. 2008-094376

(51) Int. Cl.
*G01S 13/00*    (2006.01)
(52) U.S. Cl.
USPC .............. 342/175; 342/70; 342/104; 342/118

(58) Field of Classification Search
USPC ............. 342/175, 357.76; 343/762, 771, 772, 343/776; 333/26, 248
See application file for complete search history.

(56) References Cited

U.S. PATENT DOCUMENTS

| | | | |
|---|---|---|---|
| 5,396,202 A  * | 3/1995 | Scheck .......................... 333/230 |
| 6,977,560 B2 * | 12/2005 | Itoh et al. .......................... 333/26 |
| 2002/0044033 A1 | 4/2002 | Tamaki ......................... 333/254 |
| 2006/0274992 A1* | 12/2006 | Shimura et al. .................. 385/14 |
| 2007/0013581 A1* | 1/2007 | Iijima et al. .................... 342/175 |
| 2007/0040735 A1* | 2/2007 | Matsuo et al. ................ 342/175 |
| 2009/0079648 A1* | 3/2009 | Matsuo et al. ................ 343/771 |
| 2011/0043423 A1* | 2/2011 | Kirino et al. .................. 343/776 |

FOREIGN PATENT DOCUMENTS

| | | |
|---|---|---|
| DE | 69419944 T2 | 12/1999 |
| EP | 0607044 B1 | 8/1999 |
| JP | 63-020601 | 2/1988 |
| JP | 64-013802 | 1/1989 |

(Continued)

*Primary Examiner* — John B Sotomayor
*Assistant Examiner* — Marcus Windrich
(74) *Attorney, Agent, or Firm* — DLA Piper LLP (US)

(57) ABSTRACT

A high-frequency module according to the present embodiment includes a substrate, a circuit board, and a waveguide. The substrate has an input-output portion for high-frequency signals on one surface thereof. The circuit board has a dielectric waveguide line with its end face exposed, and is placed on the one surface of the substrate such that a virtual plane extending beyond the end face is intersected by the one surface of the substrate. The waveguide has openings at ends thereof, in which one of the openings is connected to the end face of the dielectric waveguide line, and the other opening is connected to the input-output portion of the substrate.

13 Claims, 6 Drawing Sheets

(56) References Cited

FOREIGN PATENT DOCUMENTS

| | | |
|---|---|---|
| JP | 11-074701 | 3/1999 |
| JP | 2002-084208 | 3/2002 |
| JP | 2002-185203 | 6/2002 |
| JP | 2003-289201 | 10/2003 |
| JP | 2004-201163 | 7/2004 |
| JP | 2004-254068 | 9/2004 |
| JP | 2005-311337 | 11/2005 |
| JP | 2006-340317 | 12/2006 |
| JP | 2008-271295 | 11/2008 |

* cited by examiner

US 8,564,477 B2

HIGH-FREQUENCY MODULE AND METHOD OF MANUFACTURING THE SAME, AND TRANSMITTER, RECEIVER, TRANSCEIVER, AND RADAR APPARATUS COMPRISING THE HIGH-FREQUENCY MODULE

CROSS-REFERENCE TO THE RELATED APPLICATIONS

This application is a national stage of international application No. PCT/JP2009/056743, filed on Mar. 31, 2009, and claims the benefit of priority under 35 USC 119 to Japanese Patent Application No. 2008-094349, filed on Mar. 31, 2008 and Japanese Patent Application No. 2008-094376, filed on Mar. 31, 2008, the entire contents of all of which are incorporated herein by reference.

TECHNICAL FIELD

The present invention relates to a high-frequency module for use in communication equipment and a method of manufacturing the high-frequency module, and also a transmitter, a receiver, a transceiver, and a radar apparatus comprising the high-frequency module.

BACKGROUND ART

In order to achieve high-speed transmission of large-volume data, there have been proposed systems based on information-communication equipment that utilizes a high-frequency range such as a microwave range of 1 to 30 GHz and a millimeter-wave range of 30 to 300 GHz. In addition, millimeter wave-using systems and the like such as a radar apparatus that measures inter-vehicle distance have been proposed to date.

As a high-frequency circuit board structure adopted in such equipment utilizing a high-frequency range such as a microwave range and a millimeter-wave range, a monolithic microwave integrated circuit (MMIC) and a structure in which a passive electronic component is mounted on a planar circuit such as a microstrip line are known. In the planar circuit, constituent circuits such as a power divider circuit, a branch circuit, a matching circuit, a hybrid circuit, a filter circuit, and so forth are each put to its proper use to provide a circuit configuration capable of obtaining desired characteristics meeting system requirements.

Moreover, in order to effect radio wave transmission and reception in a high-frequency circuit board, an antenna board mounting an antenna is required. For connection between the circuit board and the antenna board, in order to avoid mutual influences of high-frequency signals, the circuit board and the antenna board are commonly constructed independently of each other, for example, the antenna board is connected to the back surface of the circuit board. Moreover, in general, input-output ports disposed in the circuit board and the antenna board, respectively, are connected to each other through a waveguide.

For example, in Japanese Unexamined Patent Publication JP-A 2002-84208, there is disclosed a high-frequency module constructed by arranging a circuit board and an antenna board one above the other, interposing a waveguide adaptor between the circuit board and the antenna board, and connecting an input-output port at a side of the circuit board and an input-output port at a side of the antenna board to each other through a waveguide formed in the waveguide adaptor.

Moreover, when the input-output port is an opening of a waveguide, connection between the opening and the waveguide is established by a method of, for example, as disclosed in Japanese Unexamined Patent Publication JP-A 2002-185203, connecting the mutually-corresponding openings by a solder bump.

Moreover, in Japanese Unexamined Patent Publication JP-A 2004-254068, there is disclosed a high-frequency module in which an input-output port at a side of a circuit board and an input-output port at a side of an antenna board are connected directly to each other by means of a solder bump without using a waveguide adaptor or the like.

However, in the high-frequency modules disclosed in JP-A 2002-84208 and in JP-A 2004-254068, the input-output port at the side of the circuit board and the input-output port at the side of the antenna board are provided on the opposed surfaces of the circuit board and the antenna board, respectively. Therefore, at the time of positioning of the input-output port and the waveguide or positioning of mutually-corresponding input-output ports, the input-output port is poorly visible. This leads to instability in positioning accuracy with consequent possibility of occurrence of significant positional deviation. In the event of such a positional deviation, there may be a case where local transmission-path variations take place at a connection part, for example, a transmission path over which a high-frequency signal is transmitted becomes narrow between the circuit board and the antenna board. In the local area of the transmission path subjected to variation, reflection of a high-frequency signal or the like occurs, which may give rise to a problem of an increase in transmission loss. Furthermore, the larger is the number of the input-output ports, the larger is the number of solder ps which are used for connection of the input-output ports, with consequent complication of mounting process steps.

DISCLOSURE OF INVENTION

An object of the invention is to provide a high-frequency module capable of making high-frequency connection between a circuit board and a substrate having an input-output portion configured to input and output high-frequency signals stably with lower loss and a method of manufacturing a high-frequency module, as well as to provide a transmitter, a receiver, a transceiver, and a radar apparatus comprising the high-frequency module.

A high-frequency module in accordance with one embodiment of the invention comprises a substrate, a circuit board, and a waveguide. The substrate comprises an input-output portion for high-frequency signals formed on one surface thereof. The circuit board comprises a dielectric waveguide line with its end face exposed, and is placed on the one surface of the substrate such that a virtual plane extending beyond the end face is intersected by the one surface of the substrate. The waveguide comprises openings at ends thereof. One of the openings is connected to the end face of the dielectric waveguide line, and the other thereof is connected to the input-output portion of the substrate.

Moreover, a method of manufacturing the high-frequency module in accordance with one embodiment of the invention comprises a preparation step, a circuit board placement step, and a waveguide mounting step. The preparation step is a step of preparing a substrate, a waveguide, and a circuit board. The substrate comprises an input-output portion for high-frequency signals formed on one surface thereof. The waveguide comprises openings at ends thereof, and has a relationship such that a virtual opening plane extending beyond one of the openings is intersected by a virtual opening plane extending beyond the other of the openings. The circuit board comprises a dielectric waveguide line exposed at its end face. The circuit board placement step is a step of placing the circuit board at a side of the one surface of the substrate. The waveguide mounting step is a step of mounting the waveguide on the substrate such that the one of the openings thereof is connected to the end face of the dielectric waveguide line, and the other of the openings thereof is connected to the input-output portion of the substrate.

Moreover, a method of manufacturing the high-frequency module in accordance with another embodiment of the invention comprises a preparation step, a waveguide mounting step, and a circuit board mounting step. The preparation step is a step of preparing a substrate, a waveguide, and a circuit board. The substrate comprises an input-output portion for high-frequency signals formed on one surface thereof. The waveguide comprises openings at ends thereof, and has a relationship such that a virtual opening plane extending beyond one of the openings is intersected by a virtual opening plane extending beyond the other of the openings. The circuit board comprises a dielectric waveguide line exposed at its end face. The waveguide mounting step is a step of mounting the waveguide on the substrate such that the other of the openings is connected to the input-output portion. The circuit board mounting step is a step of mounting the circuit board on the substrate such that the end face of the dielectric waveguide line is connected to the one of the openings of the waveguide.

Moreover, a transmitter in accordance with one embodiment of the invention comprises the high-frequency module, an oscillator, and an antenna. The oscillator, which is configured to produce a high-frequency signal, is mounted on the high-frequency circuit board and is connected to the planar line. The antenna, which is configured to radiate a high-frequency signal produced by the oscillator, is disposed at a side of the other surface of the substrate and is connected to the dielectric waveguide line.

Moreover, a receiver in accordance with one embodiment of the invention comprises the high-frequency module, an antenna, and a wave detector. The antenna, which is configured to acquire a high-frequency signal, is disposed at a side of the other surface of the substrate and is connected to the dielectric waveguide line. The wave detector, which is configured to detect a high-frequency signal acquired by the antenna, is mounted on the circuit board and is connected to the dielectric waveguide line.

Moreover, a transceiver in accordance with one embodiment of the invention comprises the high-frequency module, an oscillator, a branch, a transmitting antenna, a receiving antenna, and a mixer. The oscillator, which is configured to produce a high-frequency signal, is mounted on the circuit board and is connected to the planar line. The branch, which is configured to branch a high-frequency signal produced by the oscillator, is disposed in the planar line. The transmitting antenna, which is configured to radiate one of the high-frequency signals branched by the branch, is disposed at a side of the other surface of the substrate and is connected to the dielectric waveguide line. The receiving antenna, which is configured to acquire a high-frequency signal, is disposed at the side of the other surface of the substrate and is connected to the dielectric waveguide line. The mixer mixes the other of the high-frequency signals branched by the branch and a high-frequency signal acquired by the receiving antenna and outputs an intermediate-frequency signal.

Further, a radar apparatus in accordance with one embodiment of the invention comprises the transceiver and a detector. The detector detects a distance to an object to be detected or relative velocity on the basis of the intermediate-frequency signal from the mixer.

According to the circuit board of the invention, positioning of the end face of the dielectric waveguide line in a transmission direction relative to the input-output portion of the substrate can be achieved with ease, wherefore connection between them can be established without causing significant positional deviation. As a result, high-frequency connection between the circuit board and the substrate formed with the input-output portion can be established stably with lower loss.

BRIEF DESCRIPTION OF DRAWINGS

Other and further objects, features, and advantages of the invention will be more explicit from the following detailed description taken with reference to the drawings wherein.

REFERENCE SIGNS LIST

Figure 1:
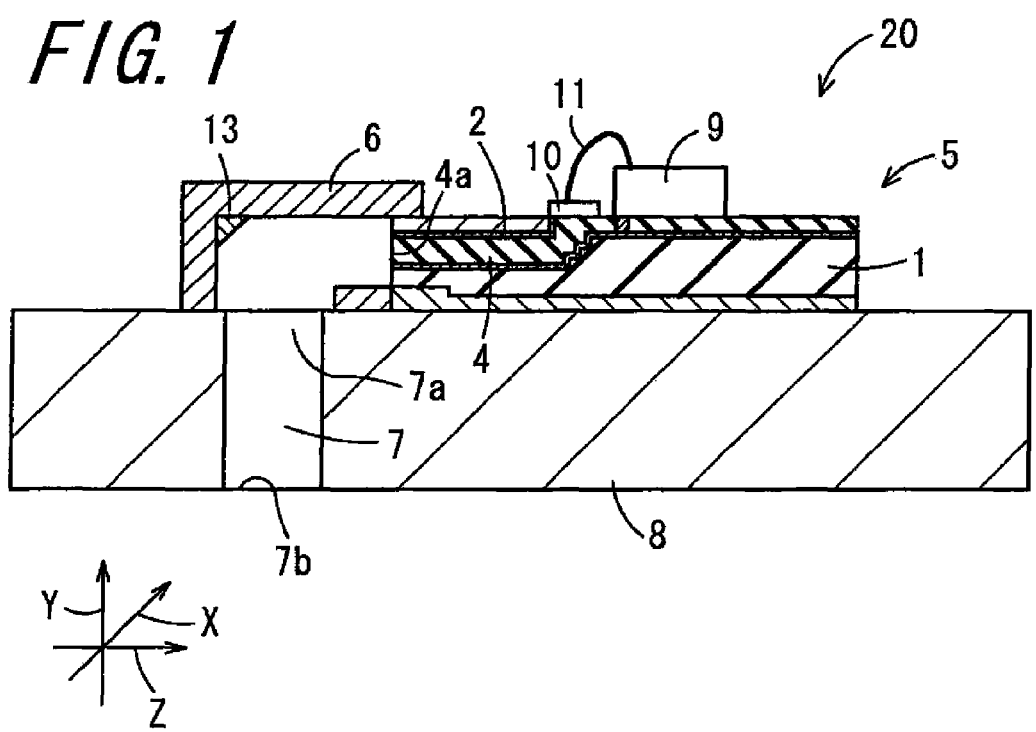
FIG. 1 is a diagram showing the structure of a high-frequency module in accordance with a first embodiment of the invention.

1: Dielectric layer
2: Conductor layer
3: Through conductor
3a: Through conductor group
4: Dielectric waveguide line
4a: End face of a transmission direction
5: Circuit board
6: Waveguide
7: Substrate waveguide
7a: First input-output port
7b: Second input-output port
8: Antenna board
9: MMIC
10: Planar line
11: Bonding wire
12: Adjustment element
13: High-frequency wave reflection preventing portion
20, 21: High-frequency module
30: Transmitter
40: Receiver
50: Transceiver
60: Radar apparatus
100: High-frequency module
101a: First cavity
101b: Second cavity
102: Stacked waveguide line
102a: Converting portion 105: Metal carrier layer
106: Electrically conductive bonding layer
108: Sealing structure
109: Control board
111: Control signal pad
112: High-frequency wave reflection preventing portion
120: Circuit board

BEST MODE FOR CARRYING OUT THE
INVENTION

Now referring to the drawings, preferred embodiments of the invention are described below.

Figure 2A:
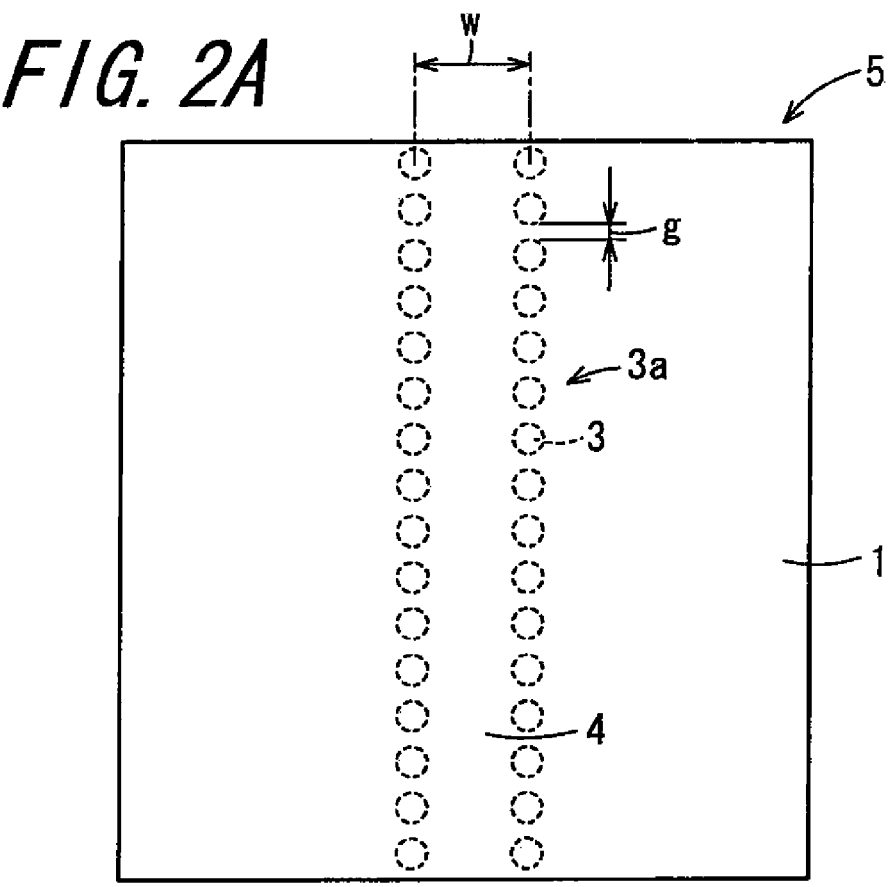
FIG. 2A is a diagram showing the structure of a circuit board.
Figure 2B:
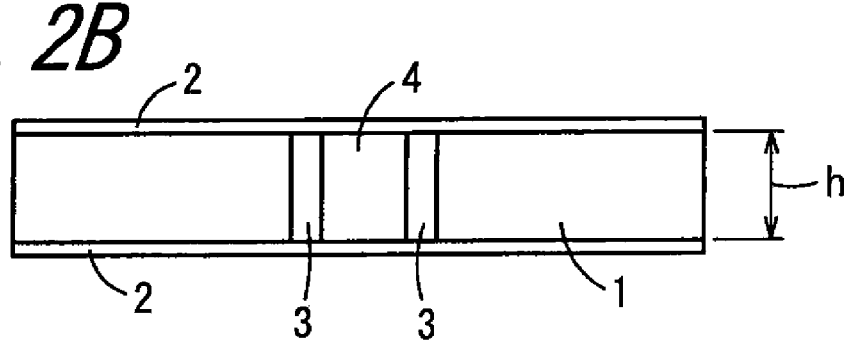
FIG. 2B is a diagram showing the structure of the circuit board.

FIG. 1 is a diagram showing the structure of a high-frequency module 20 in accordance with a first embodiment of the invention. Moreover, FIGS. 2A and 2B are diagrams showing the structure of a circuit board 5. FIG. 2A is a top view of the circuit board 5, and FIG. 2B is a side view of the circuit board 5 as viewed in a direction of high-frequency signal transmission. The high-frequency module 20 includes the circuit board 5, a waveguide 6, and a substrate 8 having a first input-output portion (a first input-output port 7a) for high-frequency signals formed on one surface thereof.

The circuit board 5 comprises a dielectric, layer 1, a pair of conductor layers 2 opposed to each other, with the dielectric layer 1 lying therebetween, and a through conductor group 3a that electrically connects the pair of conductor layers 2. The through conductor group 3a comprises a plurality of through conductors 3 passing all the way through the dielectric layer 1 to establish electrical connection between the pair of conductor layers 2. The through conductor group 3a comprises a pair of arrays of through conductors spaced apart in the high-frequency signal transmission direction by a distance g. The paired through conductor arrays are spaced apart in a direction perpendicular to the high-frequency signal transmission direction by a distance w.

The through conductor group 3a thus placed forms electrical side walls, and the side walls and the pair of conductor layers 2 constitute a dielectric waveguide line 4 acting as a waveguide.

Moreover, a plurality of dielectric waveguide lines 4 may be stacked on top of each other in layers to construct a stacked waveguide line. In this case, the number of the layers may vary from part to part within the circuit board 5.

It is noted that the distance g is less than half the wavelength of a high-frequency signal. In this case, an electromagnetic wave being fed is transmitted through the dielectric waveguide line 4 in the high-frequency signal transmission direction while being reflected without leaking from a gap between the through conductors. Moreover, although the distances g should preferably be secured at regular intervals, it is essential only that the distance g be less than half the wavelength of a high-frequency signal to be transmitted, wherefore it may be set arbitrarily so long as the above condition is fulfilled.

On the circuit board 5 shown in FIG. 1 are arranged a planar line 10 and an MMIC 9, which is a high-frequency circuit element, electrically connected to the planar line 10. The planar line 10 and the MMIC 9 are electrically connected to each other through a bonding wire 11.

The planar line 10, the bonding wire 11, etc. constitute a high-frequency transmission line conductor which is electrically connected to the dielectric waveguide line 4, and the high-frequency transmission line conductor and the dielectric waveguide line 4 constitute a high-frequency transmission line that transmits high-frequency signals in a microwave band or a millimeter-wave band.

Therefore, a high-frequency signal outputted from the MMIC 9 is transmitted through the bonding wire 11 and along a surface of the conductor layer 2 from a connection part formed between the planar line 10 and the bonding wire 11, and is further transmitted through the dielectric waveguide line 4. Note that a connection structure formed between the MMIC 9 and the planar line 10 does not necessarily have to be the bonding-wire 11 connection structure, but may be of a flip-chip connection structure.

In the circuit board 5 having the above-described connection structure, it is preferable that the dielectric layer 1 is made of ceramics from the viewpoints of precision with which to form a transmission line and easiness of manufacture, although there is no particular limitation so long as a material whose properties do not interfere with transmission of a high-frequency signal is used.

The dielectric layer 1 is obtained as follows. For example, a suitable organic solvent is admixed in powder of a raw ceramic material such as glass ceramics, alumina ceramics, aluminum nitride ceramics, or the like to prepare a slurry. The slurry is shaped into sheets by means of heretofore known doctor blade technique, calender roll technique, or otherwise. Then, the sheet-like dielectric layer 1 is subjected to an appropriate punching process, and a conductor paste is charged into a resultant via-hole to thereby form the through conductor 3. Lastly, the sheet-like dielectric layer is fired at temperatures ranging from 850° C. to 1000° C. in the case of using glass ceramics, temperatures ranging from 1500° C. to 1700° C. in the case of using alumina ceramics, or temperatures ranging from 1600° C. to 1900° C. in the case of using aluminum nitride ceramics.

It is noted that a resin material can be used for the dielectric layer 1 from the viewpoints of transmission signal frequency and manufacturing cost. Examples of the resin material which can be used for the dielectric layer 1 include fluorine resin, fluorine resin containing a glass base material, and an admixture material of inorganic particles and resin.

Moreover, for example, when the dielectric layer 1 is made of alumina ceramics, the conductor layer 2 is formed as follows. Firstly a conductor paste prepared by admixing a suitable oxide such as alumina, silica, magnesia, etc. or an organic solvent in powder of metal such as tungsten, molybdenum, etc. is printed onto the dielectric layer 1 by a thick-film printing method. After that, co-firing is performed at a temperature as high as approximately 1600° C. so that the resultant conductor layer 2 can have a thickness of approximately 5 to 50 μm. Note that, as the metal powder, powder of copper, gold, or silver is desirable in the case of using glass ceramics, and powder of tungsten or molybdenum is desirable in the case of using alumina ceramics or aluminum nitride ceramics.

The circuit board 5 of the high-frequency module 20 of the present embodiment is placed at a side of the one surface of the substrate 8 such that a virtual plane extending beyond an end face 4a of the dielectric waveguide line 4 and the one surface of the substrate 8 where the first input-output port 7a of the substrate 8 is exposed intersect each other, and preferably intersect each other substantially at right angles.

The substrate 8 has a substrate waveguide 7 formed so as to pass therethrough in its thickness direction. The substrate waveguide 7 has the first input-output port 7a acting as the first input-output portion at a side of the one surface of the substrate 7 (where the circuit board 5 is placed) and also has a second input-output port 7b acting as a second input-output portion at a side of the other surface thereof. Herein, an antenna board can be taken up as exemplary of the substrate

8. Note that the substrate waveguide 7 may either be of a space or have a dielectric material charged therein.

In a case where the substrate 8 is an antenna board, a high-frequency signal that has been outputted from the MMIC 9 and transmitted through the dielectric waveguide line 4, is transmitted through the waveguide 6 which will hereafter be described to the first input-output port 7a, and is transmitted therefrom through the substrate waveguide 7, and is radiated from the second input-output port 7b. Moreover, a high-frequency signal acquired at the second input-output port 7b is transmitted through the substrate waveguide 7 to the first input-output port 7a, is transmitted therefrom through the waveguide 6, and is transmitted through the dielectric waveguide line 4.

In this embodiment, the substrate 8 is an antenna board. In the high-frequency module 20 of this embodiment, by virtue of the positional relation such that the virtual plane of the end face 4a of the dielectric waveguide line 4 and the one surface of the substrate 8 intersect each other, connection between the end face 4a of the dielectric waveguide line 4 and the waveguide 6, as well as connection between the waveguide 6 and the first input-output port 7a, can be established under a visible condition with high positional accuracy, with consequent reduction in positional deviation between the dielectric waveguide line 4 and the first input-output port 7a.

Moreover, although it is possible to interpose, between the circuit board 5 and the substrate 8, a resin substrate or the like having peripheral circuitry that is provided for signal transfer with the circuit board 5, in the present embodiment, the circuit board 5 is fixedly mounted on the one surface of the substrate 8.

The waveguide 6 has a cavity thereinside and has openings at ends thereof. One of the openings is connected to the end face 4a of the dielectric waveguide line 4, and the other thereof is connected to the first input-output port 7a of the substrate 8. Moreover, since the virtual plane of the end face 4a of the dielectric waveguide line 4 is located so as to be intersected by the one surface of the substrate 8, it follows that the waveguide 6 is configured to have bends to provide connection between the end face 4a of the dielectric waveguide line 4 and the first input-output port 7a of the substrate 8. With the provision of such a waveguide 6 having bends to establish connection between input-output portions that differ from each other in terms of a high-frequency signal transmission direction, a band of high-frequency signals to be transmitted can be utilized extensively. Moreover, within the waveguide 6, a high-frequency signal can be transmitted under a mode conversion-free condition:

Moreover, a region lying between the end face 4a of the dielectric waveguide line 4 and the first input-output port 7a of the substrate 8 can be covered with the waveguide 6 properly, wherefore leakage of a high-frequency signal can be suppressed in the region lying between the end face 4a and the first input-output port 7a.

Moreover, the waveguide 6 may comprise grooves located on a periphery of one of the openings at intervals of substantially a quarter of the wavelength of a high-frequency signal and having a width substantially equal to the interval. Since such a groove serves as a choke, it is possible to suppress leakage of a high-frequency signal from a gap at the connection part in the opening.

It is preferable that the waveguide 6 is formed of a metal tube made of a metal such as aluminum. When the waveguide 6 is formed of a metal tube, heat dissipation can be improved, wherefore high-frequency connection between the circuit board 5 and the substrate 8 can be achieved stably with lower loss. Moreover, it is possible to construct the waveguide 6 by applying a metal plating to an inner peripheral surface of a resin tube. When the waveguide 6 is constructed by applying a metal plating to an inner peripheral surface of a resin tube, the thickness of the metal plating is determined in consideration of skin effect.

Moreover, it is preferable to dispose a high-frequency wave preventing portion 13 at an upper corner of the bend of the waveguide 6. The high-frequency is provided by bonding a triangle-prism member made of the same material as that of the waveguide 6 to the corner of the waveguide 6, or by forming a corner of an inner wall of the waveguide 6 into an inclined surface. This is intended to eliminate a right-angle corner because, when the right-angle corner exists in the cavity of the waveguide 6, an electric field concentrates at the corner and reflection of high-frequency signals occurs. This makes it possible to prevent the electric field concentration and prevent the reflection of high-frequency signals. Therefore, high-frequency connection between the circuit board 5 and the substrate 8 can be achieved stably with lower loss.

Figure 3:
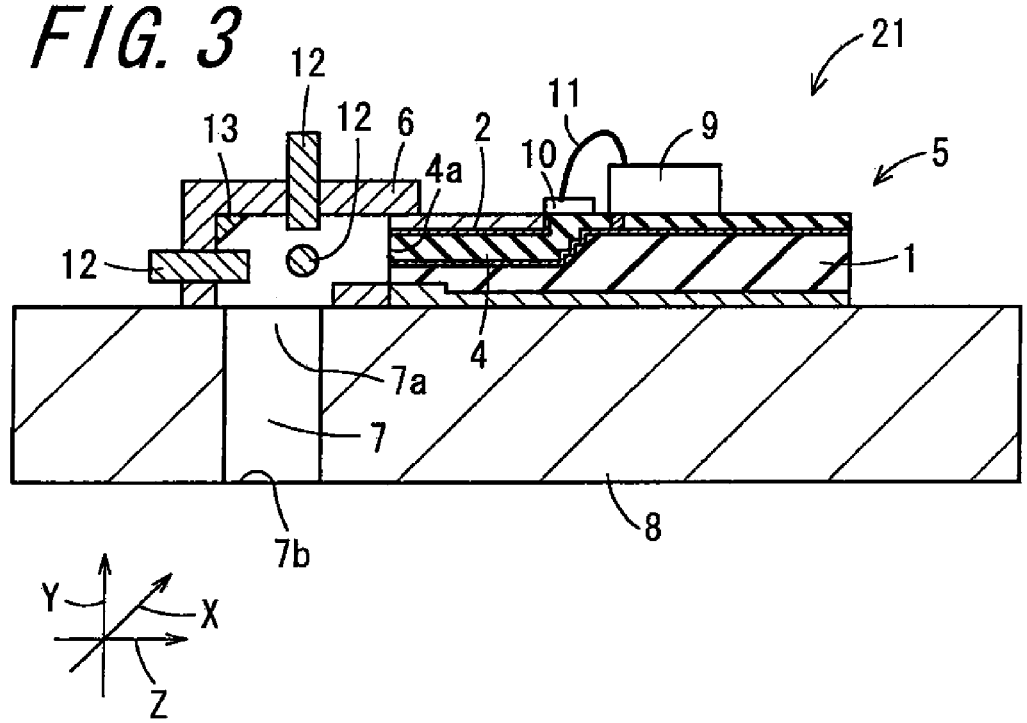
FIG. 3 is a diagram showing the structure of a high-frequency module in accordance with a second embodiment of the invention.

FIG. 3 is a diagram showing the structure of a high-frequency module 21 in accordance with a second embodiment of the invention. The high-frequency module 21 is analogous to the above-described high-frequency module 20, and thus like components will be identified with the same reference symbols and overlapping descriptions will be omitted. In the high-frequency module 21, the waveguide 6 is provided with pin-shaped adjustment elements 12 which are displaceable in each of the X-axis direction, the Y-axis direction, and the Z-axis direction within the cavity of the waveguide 6. By causing displacement of the adjustment elements 12 along a longitudinal direction thereof, the frequency of a high-frequency signal to be transmitted through the waveguide 6 can be adjusted. Note that the adjustment element 12 may be placed along at least one of the X-axis direction, the Y-axis direction, and the Z-axis direction.

Next, a method of manufacturing the high-frequency module 20, 21 will be described. To begin with, the circuit board 5 is put on the one surface of the substrate 8 and mounted thereon such that a virtual plane extending beyond the end face 4a of the dielectric waveguide line 4 for high-frequency signals and the one surface of the substrate 8 where the first input-output port 7a is exposed intersect each other, and preferably intersect each other substantially at right angles. In this way, the end face 4a of the dielectric waveguide line 4 and the first input-output port 7a of the substrate 8 serving as an input-output portion during transmission of a high-frequency signal can be visually checked at the same time.

Then, the waveguide 6 is mounted, with its one end positioned and connected with respect to the end face 4a of the dielectric waveguide line 4 and the other end positioned and connected with respect to the first input-output port 7a of the substrate 8. At this time, since the end face 4a of the dielectric waveguide line 4 and the first input-output port 7a of the substrate 8 can be visually checked at the same time, it is possible to facilitate the positioning of the waveguide 6 and thereby enhance positioning accuracy. Accordingly, in the high-frequency module 20, 21 manufactured by this manufacturing method, local variations of high-frequency signals can be suppressed at the connection part formed between the waveguide 6 and the dielectric waveguide line 4, as well as the connection part formed between the waveguide 6 and the substrate waveguide 7, wherefore high-frequency connection between the circuit board 5 and the substrate 8 can be achieved stably with lower loss.

Moreover, the waveguide 6 is mounted on the substrate 8 after the circuit board 5 is mounted on the substrate 8, with consequent greater design flexibility in the structure of the waveguide 6. Specifically, it is possible to readily implement a structure in which a part of the waveguide 6 is placed above the circuit board 5 so as to cover the end face 4a of the dielectric waveguide line 4 from above. Accordingly, the high-frequency module 20, 21 manufactured by this manufacturing method succeeds in effectively suppressing high-frequency signal leakage at the end face 4a of the dielectric waveguide line 4.

Another method of manufacturing the high-frequency module 20, 21 will be described below. To begin with, the other of the openings of the waveguide 6 is positioned and connected with respect to the opening plane of the first input-output port 7a of the substrate 8. At this time, since the first input-output port 7a can be visually checked with ease, it is possible to facilitate positioning and thereby connect the openings with the first input-output port 7a without causing significant positional deviation.

Then, the end face 4a of the dielectric waveguide line 4 is positioned and connected with respect to one opening plane of the waveguide 6, and the circuit board 5 is put on the one surface of the substrate 8 and mounted thereon. At this time, since the end face 4a of the dielectric waveguide line 4 can be visually checked with ease, it is possible to facilitate positioning and thereby connect the opening with the first input-output port 7a while minimizing positional deviation.

Accordingly, in the high-frequency module 20, 21 manufactured by this manufacturing method, local variations of the transmission path over which a high-frequency signal is transmitted can be suppressed in the input-output portion, wherefore high-frequency connection between the circuit board 5 and the substrate 8 can be achieved stably with lower loss.

Moreover, since the circuit board 5 is mounted after the waveguide 6 is mounted at the side of one surface of the substrate 8, it follows that a clearance exists between the waveguide 6 and the circuit board 5 immediately after the mounting of the circuit board 5. In this state, it becomes possible to sort out conforming items, for example, reworking can be performed after conducting characterization in this state or the clearance between the waveguide 6 and the circuit board 5 can be covered with a conductor to obtain a finished assembly.

Figure 4:
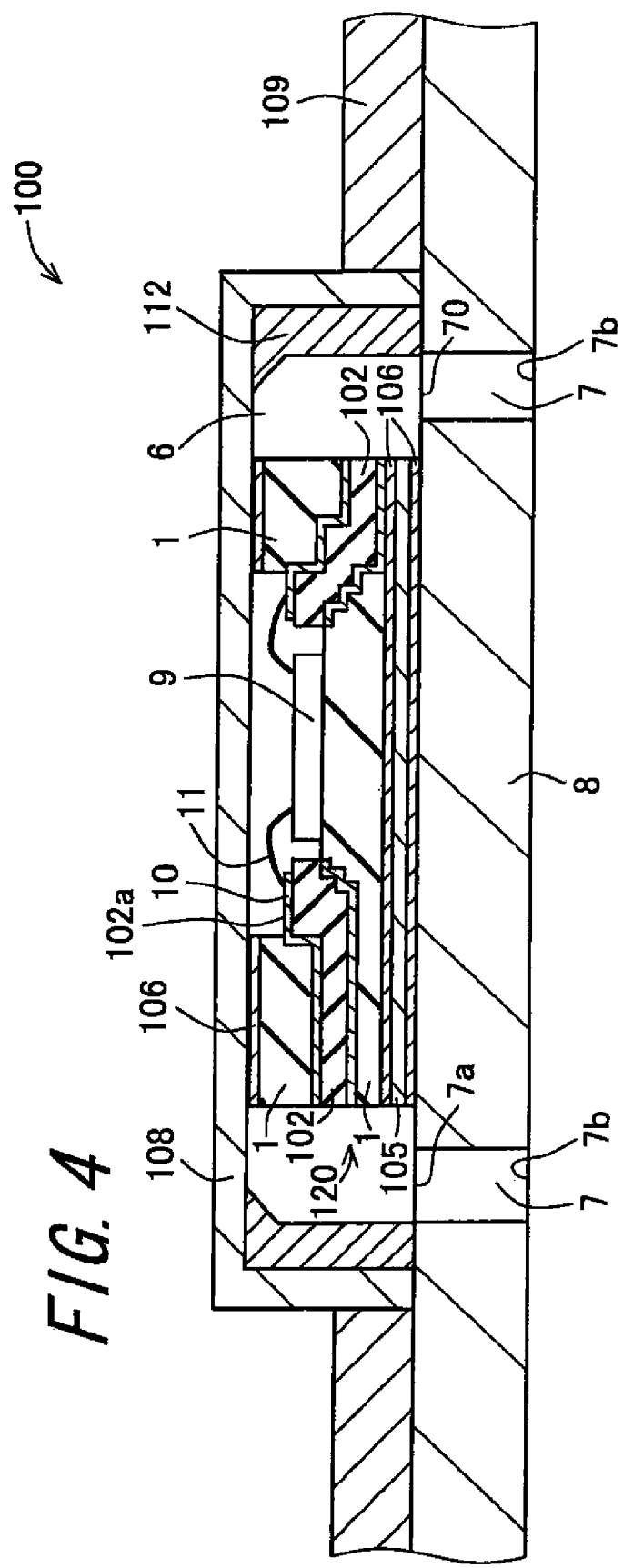
FIG. 4 is a diagram showing the structure of a high-frequency module in accordance with a third embodiment of the invention.
Figure 5:
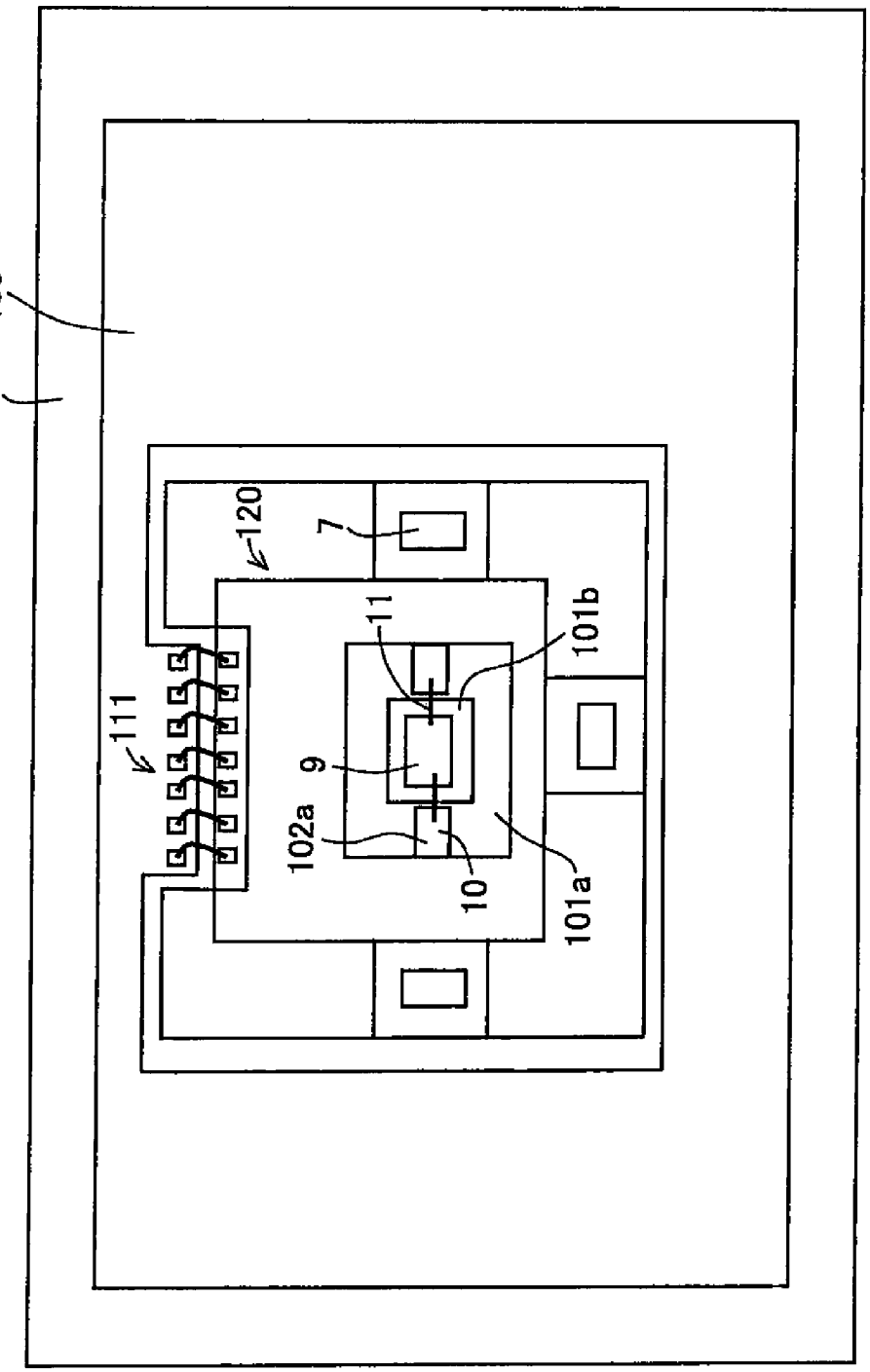
FIG. 5 is a diagram showing the structure of the high-frequency module.

FIG. 4 is a sectional view showing the structure of a high-frequency module 100 in accordance with a third embodiment of the invention. FIG. 5 is a front view showing the structure of the high-frequency module 100. In this embodiment, the same components as those in the preceding embodiment will be identified with the same reference symbols, and the description thereof will be omitted. The high-frequency module 100 includes a circuit board 120, the substrate 8 (antenna board) having the first input-output port 7a formed on one surface thereof, and a sealing structure 108 serving as a waveguide.

The circuit board 120 is a board in which a planar line 10 and a stacked waveguide line 102, which is a dielectric waveguide line formed within the dielectric layer 1, are electrically connected to each other thereby forming a high-frequency circuit. The planar line 10 is one of lines for transmission of high-frequency signals in a microwave band or a millimeter-wave band, and is more specifically designed to transmit high-frequency signals through a wiring conductor. Although a microstrip line and a coplanar line can be taken up as exemplary of the planar line 10, a microstrip line is preferable for use.

The stacked waveguide line 102 is basically similar in structure to the dielectric waveguide line 4 shown in FIGS. 2A and 2B, and its outer end surface is rendered as an input-output portion in an exposed state for the input and output of high-frequency signals.

In the circuit board 120 of the present embodiment, the dielectric layer 1 includes a first cavity 101a and a second cavity 101b which is formed inside the first cavity 101a and is smaller than the first cavity 101a. On the bottom surface of the first cavity 101a, viz., a region lying around the second cavity 101b, is disposed a converting portion 102a. On the bottom surface of the second cavity 101, the MMIC 9, etc. which is a semiconductor device is mounted.

A high-frequency signal outputted from the MMIC 9 is transmitted through the bonding wire 11 to the planar line 10, and further through the converting portion 102a and is transmitted through the stacked waveguide line 102.

Meanwhile, the substrate 8 of the present embodiment is an antenna board having a plurality of substrate waveguides 7. Moreover, on the substrate 8 is disposed a control board 109 that controls transmission and reception of high-frequency signals in the substrate 8. The control board 109 and the circuit board 120 are electrically connected to each other via a control signal pad 111.

The sealing structure 108 is provided to protect a semiconductor device such as the MMIC 9 from damage by temperature, humidity, and mechanical loss, and is thus formed so as to cover the entire circuit board 120. A surface of the circuit board 120 and an inner surface of the sealing structure 108 make intimate contact with each other, and a space is created between a lateral surface of the circuit board 120 and an inner lateral surface of the sealing structure 108. The space constitutes a waveguide 6. The first input-output port 7a of the substrate waveguide 7 is connected via the waveguide 6 to an end face of the stacked waveguide line 102.

Therefore, a high-frequency signal that has been outputted from the MMIC 9 and transmitted through the stacked waveguide line 102, is transmitted through the waveguide 6 of the sealing structure 108 to the first input-output port 7a, and is transmitted therefrom through the substrate waveguide 7, and is radiated from the second input-output port 7b. Moreover, a high-frequency signal acquired at the second input-output port 7b is transmitted through the substrate waveguide 7 to the first input-output port 7a, and is transmitted therefrom through the waveguide 6, and is transmitted through the stacked waveguide line 102.

Just as is the case with the preceding embodiment, it is preferable to dispose a high-frequency wave reflection preventing portion 112 at the upper corner of the waveguide 6.

In the present embodiment, the sealing structure 108 is made of a metal material such as aluminum. When it is made of a metal material in that way, the sealing structure 108 that covers the circuit board 120 functions to dissipate heat evolved from a semiconductor device such as the MMIC 9 to the outside, wherefore characteristic degradation of the semiconductor device can be suppressed.

As described heretofore, the high-frequency module 100 of the present embodiment is so designed that the input-output portion for the input and output of high-frequency signals in the circuit board 120 conforms to the outer end face of the stacked waveguide line 102, and the end face of the stacked waveguide line 102 and the first input-output port 7a of the substrate 8 are connected to each other by the waveguide 6 of the sealing structure 108. In this construction, the lateral surface of the circuit board can be utilized effectively, and an undesirable increase in the size of the circuit board 120 can be prevented, compared with a case where a circuit board and a substrate are arranged such that an input-output portion of the circuit board and an input-output portion of the substrate are opposed to each other, wherefore miniaturization can be achieved.

Moreover, the downsized circuit board 120 makes it possible to reduce the size of the sealing structure 108 that covers the circuit board 120. Correspondingly, the internal space of the sealing structure 108 that accommodates a semiconductor device such as the MMIC 9 can be even smaller. This makes it possible to prevent induction of an unnecessary resonance phenomenon in the internal space and thereby prevent characteristic degradation of a semiconductor device such as the MMIC 9.

Moreover, the input-output portion of the stacked waveguide line 102 and the first input-output port 7a of the substrate 8 are connected to each other by the waveguide 6, wherefore a band of high-frequency signals to be transmitted can be utilized extensively. Moreover, the waveguide 6 is disposed at the connection part formed between the input-output portion of the stacked waveguide line 102 and the first input-output port 7a of the substrate 8, wherefore a high-frequency signal can be transmitted within the waveguide 6 under a mode conversion-free condition.

Moreover, in the high-frequency module 100 of the present embodiment, the circuit board 120 is fixedly mounted on the one surface of the substrate 8 through an electrically conductive bonding layer 106 such that the end face of the stacked waveguide line 102 acting as the input-output portion and the one surface of the substrate 8 where the first input-output port 7a is exposed intersect each other, and preferably intersect each other substantially at right angles. At this time, between the circuit board 120 and the substrate 8 is formed a metal carrier layer 105 that maintains shielding between the board and the substrate. The sealing structure 108 is fixedly mounted on the dielectric layer 1, which is the uppermost layer of the circuit board 120, through an electrically conductive bonding layer 106 so as to cover the circuit board 120 and the first input-output port 7a of the substrate 8. In this construction, a space surrounded by the sealing structure 108, the lateral surface of the circuit board 120, and the substrate 8 can be created, and this space serves as the cavity waveguide 6. In this way, the structure of the high-frequency module 100 can be simplified.

Further, since the space surrounded by the first and second cavities formed in the circuit board 120 and the sealing structure 108 and the space corresponding to the waveguide 6 are spaced away from each other, it is possible to prevent intrusion of a high-frequency wave being transmitted in the space of the waveguide 6 into the space at the side of the cavity, as well as intrusion of a radiation wave radiated from the bonding wire 11 or the MMIC 9 in the space at the side of the cavity into the space of the waveguide 6.

Figure 6:
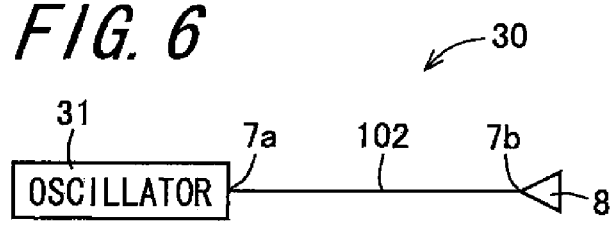
FIG. 6 is a diagram showing the structure of a transmitter in accordance with a fourth embodiment of the invention.

Next, a transmitter, a receiver, a transceiver, and a radar apparatus comprising the high-frequency module 100 will be described. FIG. 6 is a diagram showing the structure of a transmitter 30 in accordance with a fourth embodiment of the invention. The transmitter 30 of this embodiment comprises the high-frequency module 100. The transmitter 30 includes an oscillator 31 that produces high-frequency signals mounted on one surface of the circuit board 120. The oscillator 31 is connected via the planar line 10 to the stacked waveguide line 102. The transmitter 30 is configured to radiate a high-frequency signal produced by the oscillator 31 from an antenna (the second input-output port 7b) at the side of the other surface of the substrate 8 (antenna board).

Figure 7:
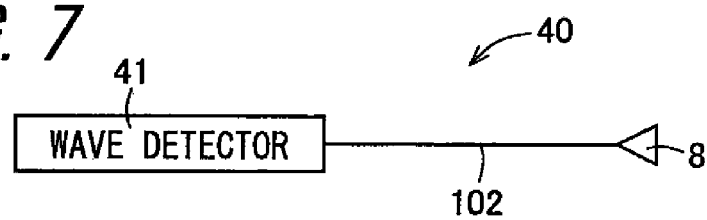
FIG. 7 is a diagram showing the structure of a receiver in accordance with a fifth embodiment of the invention.

Moreover, FIG. 7 is a diagram showing the structure of a receiver 40 in accordance with a fifth embodiment of the invention. The receiver 40 of this embodiment comprises the high-frequency module 100. The receiver 40 comprises a wave detector 41 mounted on one surface of the circuit board 120. The wave detector 41 is connected via the planar line 10 to the stacked waveguide line 102. The receiver 40 detects a high-frequency signal acquired at the antenna (the second input-output port 7b) of the substrate 8 (antenna board) by means of the wave detector 41.

Figure 8:
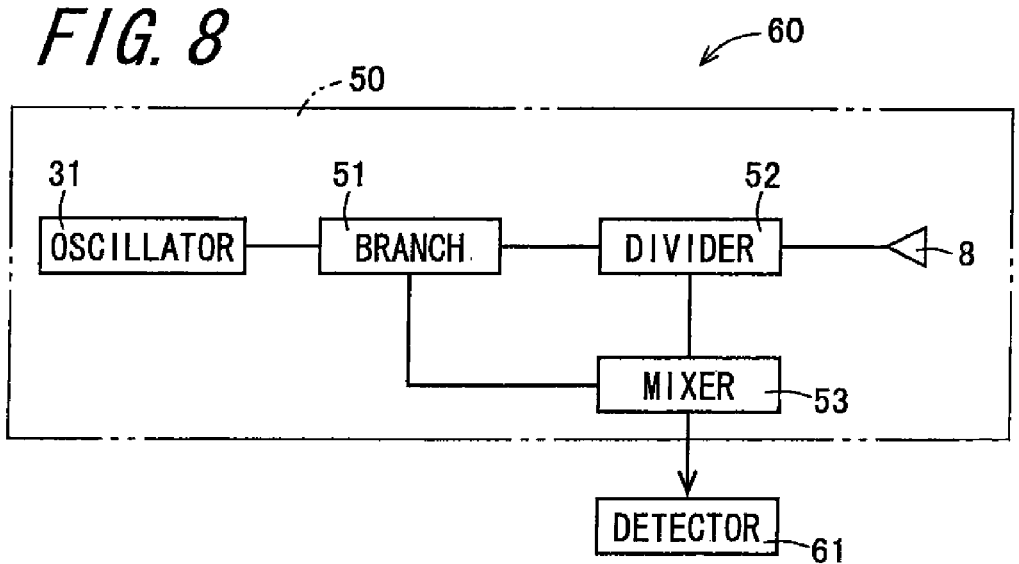
FIG. 8 is a diagram showing the structure of a transceiver and a radar apparatus in accordance with a sixth embodiment of the invention.

Further, FIG. 8 is a diagram showing the structure of a transceiver 50 and a radar apparatus 60 in accordance with a sixth embodiment of the invention. The radar apparatus 60 of this embodiment includes the transceiver 50 comprising the high-frequency module 100, and a detector 61 that detects at least a distance to an object to be detected or relative velocity on the basis of an intermediate-frequency signal from a mixer 53 disposed in the transceiver 50.

The transceiver 50 comprises the high-frequency module 100. The transceiver 50 includes an oscillator 31, a branch 51, and a mixer 53. The oscillator 31 is mounted on one surface of the circuit board 120 and is connected to the planar line 10. Moreover, the branch 51 is disposed in the planar line 10 to branch a high-frequency signal produced by the oscillator 31. One of the high-frequency signals branched by the branch 51 is radiated from an antenna (the second input-output port 7b) through a divider 52. The second input-output port 7b also acts to acquire a high-frequency signal. The mixer 53 mixes the other of the high-frequency signals branched by the branch 51 and a high-frequency signal which has been acquired at the second input-output port 7b and transmitted thereto through the divider 52 and outputs an intermediate-frequency signal.

According to the transmitter 30, the receiver 40, the transceiver 50, and the radar apparatus 60 thus far described, with the provision of the high-frequency module 100, the placement of the oscillator 31, the wave detector 41, etc. on one surface of the circuit board 120, and the placement of the substrate 8 for transmission and reception, etc. on the other surface of the circuit board 120, it is possible to, in an effective manner, transmit a high-frequency signal processed in the high-frequency circuit forming section at the side of the one surface to the substrate 8 disposed at the side of the other surface and then radiate it from the second input-output port 7b on the other surface of the substrate 8, as well as to transmit a high-frequency signal acquired at the second input-output port 7b of the substrate 8 disposed at the side of the other surface to the high-frequency circuit forming section at the side of the one surface of the circuit board 120. Accordingly, both miniaturization and excellent transmission-reception performance capability can be achieved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A high-frequency module, comprising:
   a substrate comprising an input-output portion for high-frequency signal formed in one surface thereof;
   a circuit board which is located on the one surface of the substrate and comprises a dielectric waveguide line, an end face of the dielectric waveguide line being exposed at a lateral surface of the circuit board; and
   a waveguide comprising openings at both ends thereof, one of the openings being connected to the end face of the dielectric waveguide line, and the other of the openings being connected to the input-output portion of the substrate,
wherein a virtual plane extending from the end face intersects with the one surface of the substrate.

2. The high-frequency module according to claim 1, wherein the one surface of the substrate and the virtual plane intersect with each other substantially at right angles.

3. The high-frequency module according to claim 1, wherein the waveguide further comprises grooves located on a periphery of one of the openings at intervals of substantially a quarter of a wavelength of the high-frequency signal and having a width which is substantially equal to a length of one of the intervals.

4. The high-frequency module according to claim 1, wherein the circuit board further comprises
a mounting portion configured to mount a semiconductor device thereon,
a planar line configured to electrically connect to the semiconductor device, and
a converting portion configured to convert the high-frequency signal transmission from the planar line to the dielectric waveguide line.

5. The high-frequency module according to claim 4, wherein the mounting portion and the converting portion are located in a cavity formed in the circuit board.

6. The high-frequency module according to claim 1, further comprising a sealing structure covering the end face of the dielectric waveguide line of the circuit board, with a space secured between the sealing structure and the end face,
wherein a part of the sealing structure which covers the end face of the dielectric wave guide line is configured to be the waveguide.

7. The high-frequency module according to claim 6, wherein
the sealing structure is configured to cover the input-output portion of the substrate, and
a space surrounded by an inner surface of the sealing structure, the lateral surface of the circuit board, and the one surface of the substrate is configured to be an internal space of the waveguide.

8. A method of manufacturing a high-frequency module, comprising:
preparing
a substrate comprising an input-output portion for high-frequency signal formed on one surface thereof,
a waveguide comprising openings at both ends thereof and having a relationship such that a virtual opening plane extending beyond a first one of the openings is intersected by a virtual opening plane extending beyond a second one of the openings, and
a circuit board comprising a dielectric waveguide line, an end face of the dielectric waveguide line being exposed at a lateral surface of the circuit board;
disposing the circuit board at a side of the one surface of the substrate such that a virtual plane extending from the end face intersects with the one surface of the substrate; and
mounting the waveguide on the substrate such that the first one of the openings of the waveguide is connected to the end face of the dielectric waveguide line and the second one of the openings of the waveguide is connected to the input-output portion of the substrate.

9. A method of manufacturing a high-frequency module, comprising:
preparing
a substrate comprising an input-output portion for high-frequency signal formed on one surface thereof,
a waveguide comprising openings at both ends thereof and having a relationship such that a virtual opening plane extending beyond a first one of the openings is intersected by a virtual opening plane extending beyond a second one of the openings, and
a circuit board comprising a dielectric waveguide line, and end face of the dielectric waveguide line being exposed at a lateral surface of the circuit board;
mounting the waveguide on the substrate such that the second one of the openings is connected to the input-output portion; and
mounting the circuit board on the substrate such that the end face of the dielectric waveguide line is connected to the first one of the openings of the waveguide and a virtual plane extending from the end face intersects with the one surface of the substrate.

10. A transmitter, comprising:
the high-frequency module according to claim 4;
an oscillator configured to produce the high-frequency signal, the oscillator being mounted on the circuit board and connected to the planar line; and
an antenna configured to radiate the high-frequency signal produced by the oscillator, the antenna being located at a side of the other surface of the substrate and connected to the dielectric waveguide line.

11. A receiver comprising:
the high-frequency module according to claim 4;
an antenna configured to acquire the high-frequency signal, the antenna being located at a side of the other surface of the substrate and connected to the dielectric waveguide line; and
a wave detector configured to detect the high-frequency signal acquired by the antenna, the wave detector being mounted on the circuit board and connected to the dielectric waveguide line.

12. A transceiver, comprising:
the high-frequency module according to claim 4;
an oscillator configured to produce the high-frequency signal, the oscillator being mounted on the circuit board and connected to the planar line;
a branch configured to branch the high-frequency signal produced by the oscillator, the branch being located in the planar line;
a transmitting antenna configured to radiate one of the high-frequency signals branched by the branch, the transmitting antenna being located at a side of the other surface of the substrate and connected to the dielectric waveguide line;
a receiving antenna configured to acquire the high-frequency signal, the receiving antenna being located at the side of the other surface of the substrate and connected to the dielectric waveguide line; and
a mixer configured to mix the other of the high-frequency signals branched by the branch and a high-frequency signal acquired by the receiving antenna and output an intermediate-frequency signal.

13. A radar apparatus, comprising:
the transceiver according to claim 12; and
a detector configured to detect a distance to an object to be detected or a relative velocity with the object, on a basis of the intermediate-frequency signal from the mixer.

* * * * *